US012762479B2

(12) United States Patent
Bhole et al.

(10) Patent No.: US 12,762,479 B2
(45) **Date of Patent: *Oct. 13, 2026**

(54) SYSTEM AND METHODS FOR MACHINE LEARNING TRAINING DATA SELECTION

(71) Applicant: Google LLC, Mountain View, CA (US)

(72) Inventors: Chetan Pitambar Bhole, Mountain View, CA (US); Tanmay Khirwadkar, Fremont, CA (US); Sourabh Prakash Bansod, Mountain View, CA (US); Sanjay Mangla, San Jose, CA (US); Deepak Ramamurthi Sivaramapuram Chandrasekaran, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,360

(22) Filed: Feb. 16, 2024

(65) Prior Publication Data

US 2024/0193475 A1 Jun. 13, 2024

Related U.S. Application Data

(63) Continuation of application No. 18/061,846, filed on Dec. 5, 2022, now Pat. No. 11,907,817, which is a continuation of application No. 16/731,984, filed on Dec. 31, 2019, now Pat. No. 11,521,134.

(51) Int. Cl.

| | |
|---|---|
| ***G06F 9/04*** | (2006.01) |
| ***G06F 11/3668*** | (2025.01) |
| ***G06F 18/214*** | (2023.01) |
| ***G06N 20/00*** | (2019.01) |
| ***G06N 20/20*** | (2019.01) |

(52) U.S. Cl.
CPC ......... *G06N 20/00* (2019.01); *G06F 11/3668* (2013.01); *G06F 18/214* (2023.01); *G06N 20/20* (2019.01)

(58) Field of Classification Search
CPC .... G06N 20/20; G06F 18/214; G06F 11/3668
See application file for complete search history.

(56) References Cited

U.S. PATENT DOCUMENTS

| | | | | |
|---|---|---|---|---|
| 10,990,848 | B1 | 4/2021 | Pahde et al. | |
| 2002/0188582 | A1* | 12/2002 | Jannarone .............. | G06N 20/00 706/26 |
| 2009/0106178 | A1 | 4/2009 | Chu | |
| 2014/0046880 | A1 | 2/2014 | Breckenridge et al. | |
| 2014/0114746 | A1 | 4/2014 | Pani et al. | |
| 2014/0358825 | A1 | 12/2014 | Phillipps et al. | |
| 2016/0260125 | A1 | 9/2016 | Xu et al. | |
| 2017/0061329 | A1* | 3/2017 | Kobayashi ............. | G06N 20/00 |
| 2019/0171725 | A1* | 6/2019 | Shen ...................... | G06Q 50/01 |
| 2019/0205402 | A1* | 7/2019 | Sernau ............... | G06Q 30/0282 |
| 2020/0057960 | A1 | 2/2020 | Aminzadeh et al. | |
| 2020/0111000 | A1 | 4/2020 | Xiong et al. | |

* cited by examiner

*Primary Examiner* — Hang Pan
(74) *Attorney, Agent, or Firm* — Lowenstein Sandler LLP

(57) ABSTRACT

Simulation data associated with a simulation test performed with respect to a first set of training data is obtained. Responsive to a determination that the obtained simulation data satisfies one or more criteria, a second set of training data is obtained, where a size of the second set of training data meets or exceeds a size of the first set of training data. A machine learning model is trained using the second set of training data.

20 Claims, 7 Drawing Sheets

SYSTEM AND METHODS FOR MACHINE LEARNING TRAINING DATA SELECTION

RELATED APPLICATIONS

This application is a continuation application of co-pending U.S. application Ser. No. 18/061,846, filed Dec. 5, 2022, and entitled "SYSTEM AND METHODS FOR MACHINE LEARNING TRAINING DATA SELECTION," which is a continuation application of co-pending U.S. patent application Ser. No. 16/731,984, filed Dec. 31, 2019, and entitled "SYSTEM AND METHODS FOR MACHINE LEARNING TRAINING DATA SELECTION," now U.S. Pat. No. 11,521,134, which is incorporated herein by reference.

TECHNICAL FIELD

Aspects and implementations of the present disclosure relate to using results of a simulation performed using a gradually trained machine learning model to determine an amount of training data sufficient to train other machine learning models.

BACKGROUND

Recommendation systems frequently use machine learning models to provide recommendations for content items to be presented to users of a content-sharing platform based on various input data. When a new content item is introduced to a recommendation system, a machine learning model may not accurately recommend the new content item until sufficient training data pertaining to the new content item is collected and used to train the machine learning model.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for using results of a simulation performed using a gradually trained machine learning model to determine an amount of training data sufficient to train other machine learning models. In an implementation, simulation tests are run on a first machine learning model to obtain results that are produced during a respective simulation test. The first machine learning model is gradually trained using first training data historically collected over a period of time. The first training data includes first training data sets each including a subset of first training inputs and first target outputs associated with a point in time of points in time during the period of time. A simulation test is determined at which corresponding results of the first machine learning model satisfy a threshold condition. The threshold condition is based on historical data at a first point in time of the points in time. A first training data set of the first training data sets on which the first machine learning model used during the determined simulation test was trained is identified. The first training data set on which the first machine learning model used during the determined simulation test was trained is associated with one or more second points in time that precede the first point in time. A subset of target outputs is determined form the identified first training data set on which the first machine learning model used during the determined simulation test was trained. The determined subset of first target outputs defines a threshold amount of second training data to be sufficient to train a second machine learning model.

In some implementations, a system and method are disclosed for training a machine learning model using training data collected until threshold target outputs are satisfied. In an implementation, a first amount of target outputs that was used to train a first machine learning model and that resulted in a performance of the first trained machine learning model satisfying a threshold condition is identified. The first amount of target outputs was part of first training data for the first machine learning model. The first training data included first training data sets each including a subset of first training inputs and first target outputs. Second training data is collected for a second machine learning model. The second training data includes second training data sets each including a subset of second training inputs and second target outputs. The second training data is collected until a second amount of second target outputs satisfies the first amount of first target outputs. The second machine learning model is trained using the second training data collected until the second amount of second target outputs satisfies the first amount of first target outputs.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
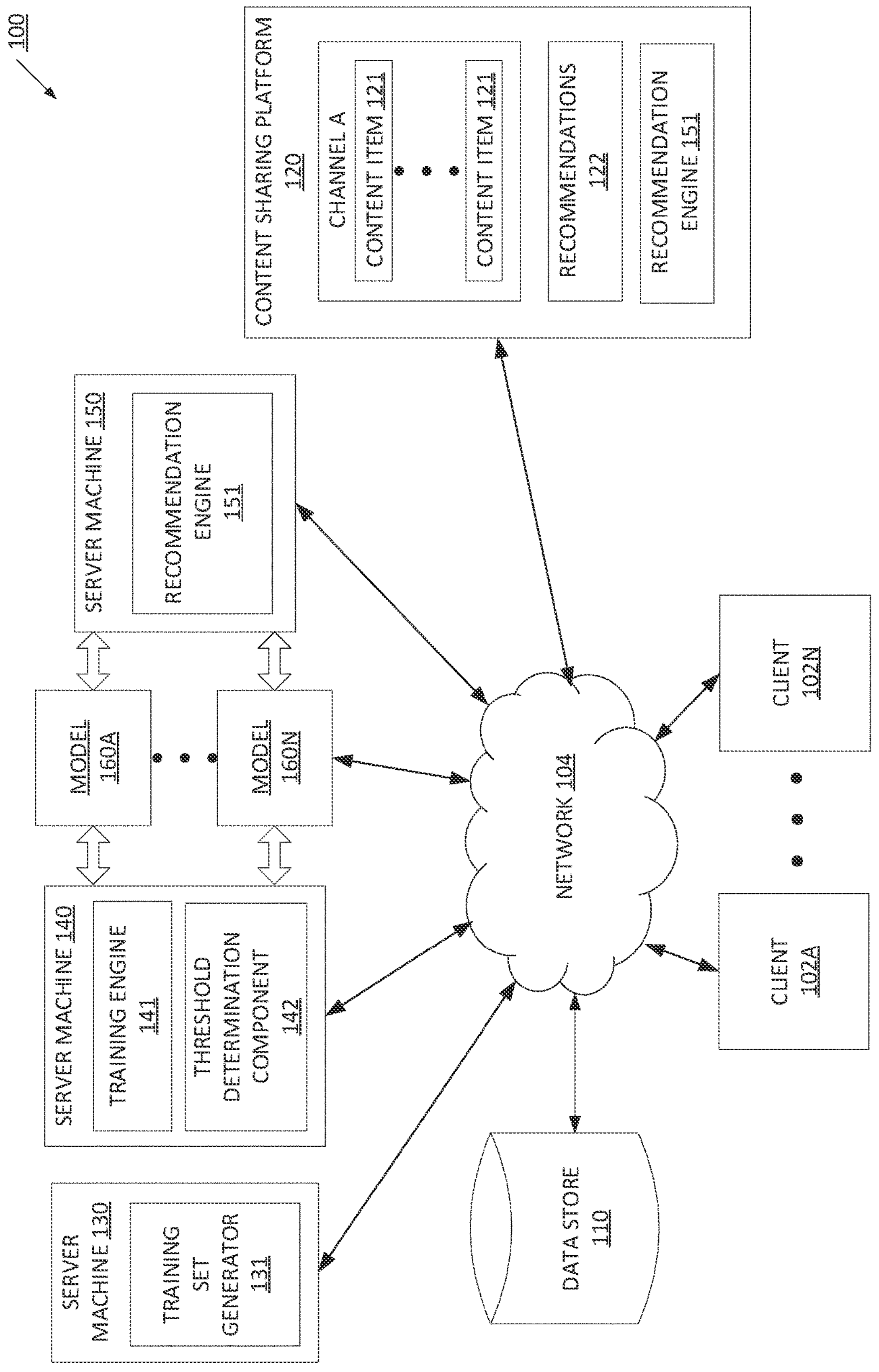
FIG. 1 illustrates an example system architecture, in accordance with implementations of the present disclosure.

Aspects of the present disclosure are directed to using results of a simulation performed based on a gradually trained machine learning (ML) model to determine an amount of training data sufficient to train other machine learning models. ML models are frequently used in recommendation systems that provide recommendations of content items for presentation to users of a content sharing platform. A ML model of a recommendation system may be trained to predict content items that a user is likely to consume, interact with, and/or respond to (e.g., by performing an activity prompted by the content item, etc.). The ML model may have been previously trained using collected historical data pertaining to the content items of the content sharing platform. In some instances, a content item publisher may provide a new content item to the content sharing platform that has different characteristics from other content items of the content sharing platform. In such instances, a sufficient amount of historical data associated with the new content item may not be available for training the ML model. As such, the ML model may not provide accurate predictions. Therefore, the recommendation system may not provide accurate recommendations for content items of the content sharing platform, including the new content item. This is commonly referred to as the cold-start problem.

Conventionally, the recommendation system may use predictions regarding the new content item generated by the ML model, even though the ML model was not trained using a sufficient amount of historical data pertaining to the new content item. For example, during an initial time period after the new content item is introduced to the recommendation system, the ML model may not provide accurate predictions, and therefore may not provide accurate recommendations of content items for presentation to a user. As the ML model continues to provide predictions, historical data associated with the new content item is collected and used as training data to train the ML model. The ML model may be continuously trained using the collected historical data until a sufficient amount of training data is collected and the ML model is adequately trained to provide accurate predictions.

In some instances, a significant amount of time (e.g., weeks, months) may pass before a sufficient amount of training data for a new content item is collected and used to train the ML model. During that time, the recommendation system may provide inaccurate recommendations of content items for presentation to users, thereby reducing the overall effectiveness of the recommendation system.

Implementations of the present disclosure address the above and other deficiencies by providing a graduated ML model where different training data sets are used to train the ML model based on an amount of training data included in each training data set. In some implementations, the graduated ML model is used in a recommendation system that provides recommendations of content items for presentation to users of a content sharing platform. Each training set used to train the graduated ML model may include different subsets of training inputs and target outputs each including a different level of granularity.

In an illustrative example, a new content item may be introduced to the recommendation system where a sufficient amount of collected historical data is not available to train the graduated ML model. During an initial time period, the recommendation system may make recommendations for the new content item without using the graduated ML model. For example, the new content item may be added to a group of new content items where each of the group of new content items is randomly selected by the recommendation system for presentation to a user of the content sharing platform.

During the initial time period, historical data associated with the new content item may be collected to be used as training data in a first training data set. Historical data may include data pertaining to the new content item and/or a user that is presented with the content item. For example, the historical data may include one or more attributes associated with the new content item (e.g., background color of the content item, a font displayed with the content item, etc.), one or more attributes associated with the user (e.g., information obtained from a user profile associated with the user, etc.), and/or contextual information (e.g., a geographic location) associated with a user device of the user.

A first training data set may be generated based on the collected historical data. In one example, training inputs of a first training data set may include an identifier of a content item previously presented to a user of the content sharing platform. Target outputs of the first training set may include an indication of whether the user consumed the content item and an indication of whether the user interacted with the content item.

Once a sufficient amount of historical data pertaining to the new content item is collected, the graduated ML model may be trained using the first training data set and used to provide predictions regarding content items of the content sharing platform, including the new content item. A collected amount of historical data may be considered to be sufficient when a first threshold amount of target outputs of the first training data set has been collected. The first threshold amount of target outputs may define an amount of training data sufficient to train a ML model such that predictions provided by the ML model are a basis for recommendations from the recommendation system that are more accurate (i.e., a user is more likely to consume and/or interact with the content item) than recommendations made without using the ML model (e.g., recommendations made using random selection of a content item from a group of content items). In some implementations, the first threshold amount of target outputs may be determined based on results of simulation tests run on an experimental ML model where the experimental ML model was gradually trained using historically collected training data pertaining to one or more content items of the content sharing platform.

After a sufficient amount of first training data has been collected for the first training data set and the graduated ML model is trained using the first training data set, the graduated ML model may be used to provide predictions regarding content items, including the new content item, to be recommended for presentation to users of the content sharing platform. In an example, the graduated ML model trained using the first training data set may provide predictions for content items solely based on an identifier of a potential content item. As the graduated ML model is used to provide predictions, additional historical data pertaining to the new content item may be continuously collected. A second training data set may be generated using the additional historical data and the original historical data, where the second training data set may provide an increased level of granularity for the graduated ML model. For example, the second training set may include training inputs including one or more attributes of the content item, one or more attributes of a user that was previously presented with the content item, and contextual information associated with a user device of the user.

Once a sufficient amount of additional historical data pertaining to the new content item is collected, the graduated ML model may be re-trained using the second training data set and used to provide predictions regarding the new content item. A collected amount of additional historical data may be considered to be sufficient when a second threshold amount of target outputs for the second training data set has been collected. The second threshold amount of target outputs may define an amount of training data sufficient to train a ML model such that predictions provided by the ML model are a basis for recommendations from the recommendation system that are more accurate than recommendations made using the ML model trained using the first training data set. In some implementations, the second threshold amount of target outputs may be determined based on results of additional simulation tests run on the experimental ML model.

In some implementations, a third training data set and/or a fourth training data set may be collected and used to train the graduated ML model, where the third and/or fourth training data set provide an increased level of granularity for the graduated ML model. For example, training inputs of the third training data set may include an identifier of a content item previously presented to a user. Target outputs of the third training data set may include an indication as to whether the user consumed the content item, an indication as to whether the user interacted with the content item, and an indication as to whether the user performed an activity prompted by the content item. Training inputs of the fourth training data set may include one or more attributes associated with a content item previously presented to a user, one or more attributes associated with the user, and contextual information associated with a user device of the user. Target outputs of the fourth training data set may include an indication as to whether the user consumed the content item, an indication as to whether the user interacted with the content item, and a third indication as to whether the user performed an activity prompted by the content item. The graduated ML model may be trained using the third and/or fourth training data sets in accordance with previously described implementations (i.e., responsive to a sufficient amount of training data being collected).

Accordingly, aspects of the present disclosure provide a mechanism by which new content items can be effectively recommended for presentation to users of a content sharing platform. Because the graduated ML model used by the recommendation system is gradually trained using training data sets with increasing levels of granularity, accurate predictions regarding the new content item may be provided by the graduated ML model more quickly than by using the ML model to provide predictions before a sufficient amount of historical data is collected or by the recommendation system randomly recommending the new content item until a sufficient amount of historical data is collected. As such, an overall effectiveness of the recommendation system for the content sharing platform is increased.

FIG. 1 illustrates an example system architecture 100, in accordance with implementations of the present disclosure. The system architecture 100 (also referred to as "system" herein) includes client devices 102A-N, a data store 110, a content sharing platform 120, and one or more server machines 130-150, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital content items (e.g., digital video items, digital images, electronic books, etc.). According to aspects of the disclosure, the content viewer may be a content sharing platform application for users to record, edit, and/or upload content for sharing on the content sharing platform. As such, the content viewers may be provided to the client devices 102A-102N by content sharing platform 120. For example, the content viewers may be embedded media players that are embedded in web pages provided by the content sharing platform 120.

The content viewer may further allow a user to request content to be presented via the UI of the content viewer (referred to herein as requested content). In some implementations, the content viewer may allow content not requested by the user to be presented via the UI (referred to herein as supplemental content). In some implementations, supplemental content may be requested for presentation to the user by content sharing platform 120 rather than the user. In some implementations, the content viewer may present the requested content in a first portion of the UI and the supplemental content in a second portion of the UI. The supplemental content may be the same or a different type of content than the requested content. For example, a user may request a video item and the content viewer may present the requested video item in a first portion of the UI and a supplemental digital image in a second portion of the UI. In some embodiments, the supplemental content may be related to the requested content. In accordance with the previous example, the requested video item may be related to skateboarding and the supplemental digital image may include a message prompting the user to download a mobile application relating to skateboarding.

A content item 121 may be consumed via the Internet or via a mobile device application, such as a content viewer of client device 102A-N. In some implementations, a content item 121 may be a requested content item or a supplemental content item, in accordance with previously described implementations. As used herein, "media," media item," "online media item," "digital media," "digital media item," "content," "content item," "supplemental content," and "supplemental content item" can include an electronic file that can be executed or loaded using software, firmware or hardware configured to present the digital media item to an entity. In one implementation, the content sharing platform 120 may store content items 121 using the data store 110. In another implementation, the content sharing platform 120 may store content items or fingerprints as electronic files in one or more formats using data store 110.

In one implementation, the content items 121 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some implementations, data store 110 is a persistent storage that is capable of storing content items as well as data structures to tag, organize, and index the content items. Data store 110 may be hosted by one or more storage devices, such as main memory, magnetic or optical storage-based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by content sharing platform 120 or one or more different machines coupled to the server content sharing platform 120 via network 104.

In one implementation, content sharing platform 120 or server machines 130-150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to content items 121 and/or provide the content items 121 to the user. For example, content sharing platform 120 may allow a user to consume, upload, search for, approve of ("like"), disapprove of ("dislike"), or comment on content items 121. Content sharing platform 120 may also include a website (e.g., a webpage) or application back-end software that may be used to provide a user with access to the content items 121.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

Content sharing platform 120 may include multiple channels (e.g., channels A through Z). A channel can include one or more content items 121 available from a common source or content items 121 having a common topic, theme, or substance. Content items 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

In some implementations, a recommendation system may be configured to provide recommendations of content items, such as recommendations 122, for presentation to a user of content sharing platform 120. In other or similar implementations, the recommendation system may be further configured to provide recommendations of supplemental content items 121 to be presented to a user along with one or more content items requested by the user. The recommendation system may include at least a training set generator 131, a training engine 141, a ML model 160, and a recommendation engine 151. In some implementations, the recommendation system may further include a threshold determination component 142.

In some implementations, a recommendation 122 may be an indicator (e.g., interface component, electronic message, recommendation feed, etc.) that provides a user with personalized suggestions of content items that may appeal to a user. In other or similar implementations, a recommendation 122 may be an indicator that provides content sharing platform 120 with a personalized suggestion of content items 121 that should be presented to the user. For example, a recommendation 122 may indicate a supplemental content item 121 for presentation to a user. In one implementation, a recommendation 122 may be based on an output of a trained ML model 160, such as ML models 160A-N.

Server machine 130 includes a training set generator 131 that is capable of generating training data (e.g., a set of training inputs and a set of target outputs) to train ML models 160A-N. Training data may be generated based on historical data pertaining to content items 121 presented to users of content sharing platform 120. In some implementations, supplemental content items from one or more groups of content items 121 have previously been presented to users. Each group of content items 121 may be associated with a common topic. For example, a first group of content items 121 may be associated with prompting users to join an electronic messaging list and a second group of content items 121 may be associated with prompting users to subscribe to a social media account of a content provider.

In some implementations, content items 121 from the one or more groups of content items 121 have been previously presented to users of content sharing platform 120 based on a random selection of a content item 121 from a group. For example, in response to a request for a content item, either by a user or content sharing platform 120, one or more groups of content items 121 may be identified by the recommendation system. A content item from a group of content items 121 may be selected, at random, for presentation to a user. As each content item 121 is randomly selected and presented to a user, historical data pertaining to the content item 121 is collected and stored in data store 110.

In some implementations, the historical data may include an identifier associated with content item 121, one or more attributes associated with content item 121, one or more attributes associated with the user, contextual information associated with a user device of the user, etc. In further implementations, the historical data may also include data pertaining to user engagement with the supplemental content item 121. For example, the historical data may include data indicating whether the user consumed content item 121, interacted with content item 121, or performed an activity prompted by content item 121.

Data store 110 may store historical data pertaining to multiple groups of content items 121 previously presented to users of content sharing platform 120. In some implementations, content items 121 of each group were randomly presented to users. In other or similar implementations, content items 121 of each group were presented to users based on a recommendation made by a ML model 160. Training set generator 131 may generate a training data set associated with a group of content items 121 by identifying a set of historical data for each content item 121 of the group. For example, training set generator 131 may identify each content item 121 of the group based on a common group identifier associated with each content item 121 of the group.

In response to identifying the set of historical data, training set generator 131 may generate a set of training data. The set of training data may include a subset of training inputs and training outputs based on the identified set of historical data. In some implementations, each of the subset of training inputs may include at least one of an identifier associated with a content item 121 (e.g., a supplemental content item), one or more attributes associated with the content item 121, one or more attributes associated with a user previously presented with the content item 121, and/or contextual information associated with a user device of the user. Each of the subset of target outputs may include data pertaining to the user's engagement, including whether the user consumed the content item 121, interacted with the content item 121, or performed an activity prompted by the content item 121.

Server machine 140 may include a training engine 141 and a threshold determination component 142. Training engine 141 may train a ML model 160A-N using the training data from training set generator 131. The ML model 160A-N may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the ML model 160A-N that captures these patterns. The ML model 160A-N may be composed of, e.g., a single level of linear or non-linear operations (e.g., a support vector machine [SVM] or may be a deep network, i.e., a ML model that is composed of multiple levels of non-linear operations). An example of a deep network is a neural network with one or more hidden layers, and such ML model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained by training set generator 131 hosted by server machine 130.

Threshold determination component 142 may determine whether a sufficient amount of training data has been generated by training set generator 131 to train ML model 160. Threshold determination component 142 may determine that a sufficient amount of training data has been generated if a threshold number of target outputs has been generated for a set of training data. The threshold number of target outputs may be determined based on results of a simulation test run on an experimental ML model. The experimental ML model may have been trained using training data historically collected over a period of time. Further details regarding the simulation test run on the experimental ML model are provided with respect to FIGS. 2 and 3A-3C.

In response to threshold determination component 142 determining that a sufficient amount of training data has been generated by training set generator 131, training engine 141 may train ML model 160 using the generated training data. In response to threshold determination component 142 determining that a sufficient amount of training data has not been generated by training set generator 131, training engine 141 may delay training ML model 160 until additional training data is generated by training set generator 131 such that the training data includes at least the threshold number of target outputs.

In some implementations, threshold determination component 142 may determine that a first training data set includes a first threshold amount of training data to train the ML model, but a second training data set does not include a second threshold amount of training data sufficient to train the ML model. In such implementations, ML model 160A-N may be trained using the first training data set and used to provide predictions regarding content items 121 for presentation to a user. Threshold determination component 142 may also instruct training set generator 131 to continue to collect training data for the second training data set until the threshold amount of training data is collected. In response to determining the threshold amount of training data has been collected for the second training data set, threshold determination component 142 may cause training engine 141 to train ML model 160A-N using the second training data set. ML model 160A-N may be similarly trained using a third training data set and/or a fourth training data set in response to threshold determination component 142 determining a third threshold amount of training data and/or a fourth threshold amount of training data has been collected by training set generator 131, respectively.

Server machine 150 includes a recommendation engine 151 that provides data (e.g., attributes associated with a previously presented content item 121 that was consumed by each of a set of users of content sharing platform 120, attributes associated with a user accessing content sharing platform 120, contextual information associated with the user, etc.) as input to trained ML model 160A-N to obtain one or more outputs. Each output may include an identifier of a content item 121 of content sharing platform 120 and confidence data associated with the content item 121. In some implementations, recommendation engine extracts confidence data from each output, where the extracted data indicates a level of confidence a user will consume a respective content item 121, a level of confidence the user will interact with the content item 121, and/or a level of confidence the user will perform an activity prompted by the content item 121. Recommendation engine 151 may use the confidence data to provide recommendations of one or more content items 121 for presentation to a user.

It should be noted that in some other implementations, the functions of server machines 130, 140, and 150 or content sharing platform 120 may be provided by a fewer number of machines. For example, in some implementations server machines 130 and 140 may be integrated into a single machine, while in other implementations server machines 130, 140, and 150 may be integrated into multiple machines. In addition, in some implementations one or more of server machines 130, 140, and 150 may be integrated into content sharing platform 120.

In general, functions described in implementations as being performed by content sharing platform 120 or server machines 130, 140, 150 can also be performed on the client devices 102A-Z in other implementations, if appropriate. In addition, the functionality attributed to a particular component can be performed by different or multiple components operating together. Content sharing platform 120 or server machines 130, 140, 150 can also be accessed as a service provided to other systems or devices through appropriate application programming interfaces, and thus is not limited to use in websites.

Although implementations of the disclosure are discussed in terms of content sharing platform 120 and promoting social network sharing of a content item 121 on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
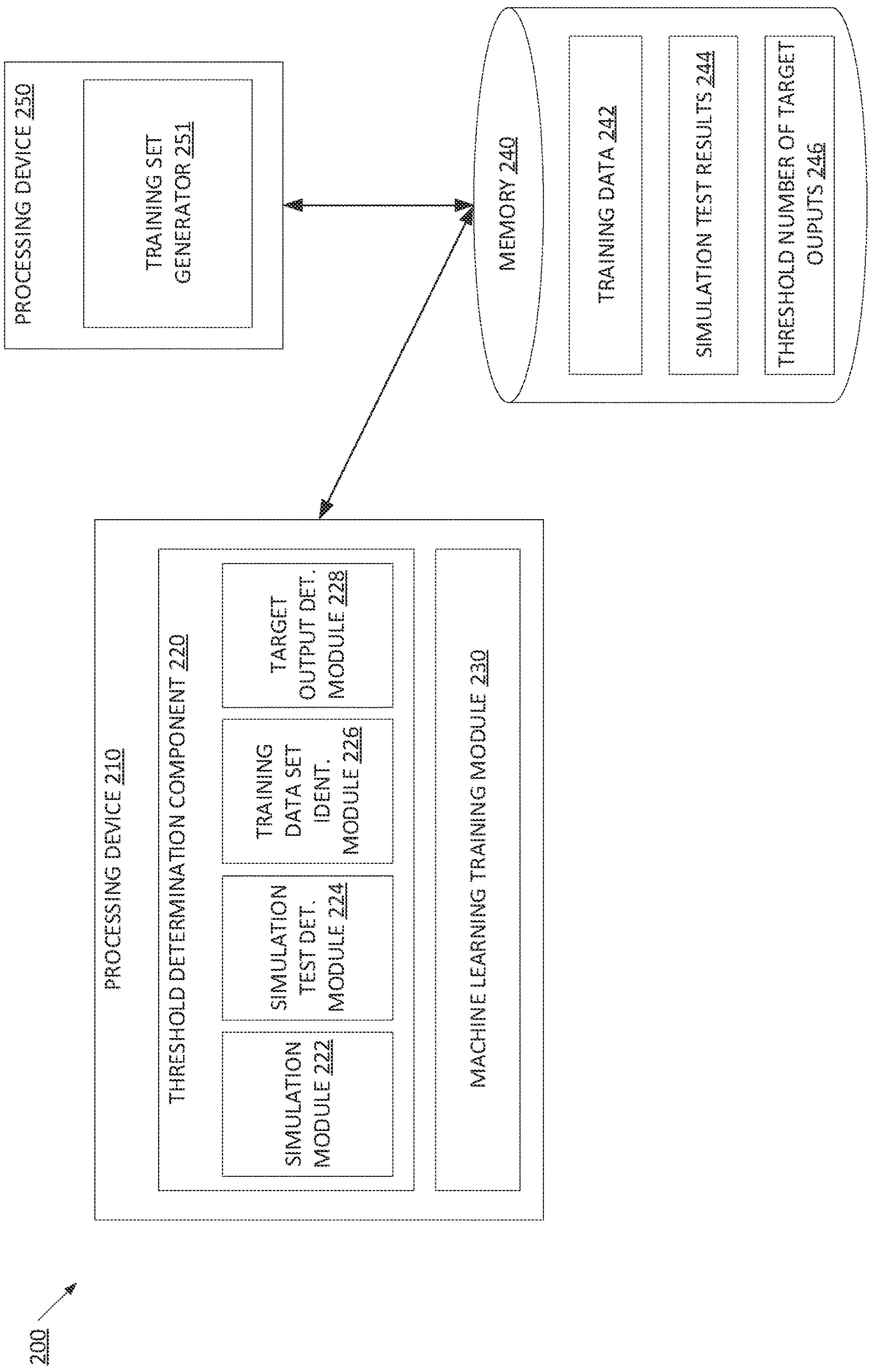
FIG. 2 is a block diagram illustrating a threshold determination component and a training set generator, in accordance with implementations of the present disclosure.

FIG. 2 is a block diagram illustrating a threshold determination component 220, in accordance with implementations of the present disclosure. Threshold determination component 220 may correspond to threshold determination component 142 of FIG. 1. As shown in FIG. 2, threshold determination component 220 may be a component of computing apparatus 200 that includes a processing device 210 and a processing device 250 each operatively coupled to memory 240. Processing device 210 may be configured to execute threshold determination component 220. Processing device 250 may be configured to execute training set generator 251. Training set generator 251 may correspond to training set generator 131. In some implementations, processing devices 210 and 250 may each correspond to processing device 702 and memory 240 may correspond to volatile memory 704 and/or non-volatile memory 706, as described with respect to FIG. 7.

Threshold determination component 220 may be configured to determine whether a sufficient amount of training data has been generated by training set generator 251 for training one or more ML models, such as ML models 160A-N of FIG. 1. In some implementations, threshold determination component 220 may determine whether a sufficient amount of training data has been generated by determining whether a sufficient amount of target outputs of the training data has been generated. Threshold determination component 220 may determine whether a sufficient amount of target outputs has been generated based on an amount of target outputs that were used to train a ML model.

Threshold determination component 220 may include a simulation module 222, a simulation test determination module 224, a training data set identification module 226, and a target output identification module 228. Simulation module 222 may run one or more simulation tests on a ML model that is gradually trained using training data, such as training data 242 stored at memory 240. Training data 242 may include two or more training data sets each including a subset of training inputs and target outputs. In some implementations, training data 242 may be generated by training set generator 251 based on historically collected data over a period of time. Each training data set may be associated with a point in time during the period of time. For example, if the period of time is 14 days, each training data set may be associated with training data 242 collected during one day of the 14 days (i.e., the training data includes 14 training data sets). In some implementations, each training data set may be further associated with a group of content items of the content sharing platform associated with a common topic (e.g., providing a message prompting a user to sign up for an electronic mailing list).

Training set generator 251 may generate the experimental training data based on historically collected data stored in a data store associated with the content sharing platform, such as data store 110. Training set generator 251 may identify, from data store 110, historical data pertaining to content items included in the group of content items associated with the common topic, in accordance with previously described embodiments.

Figure 3:
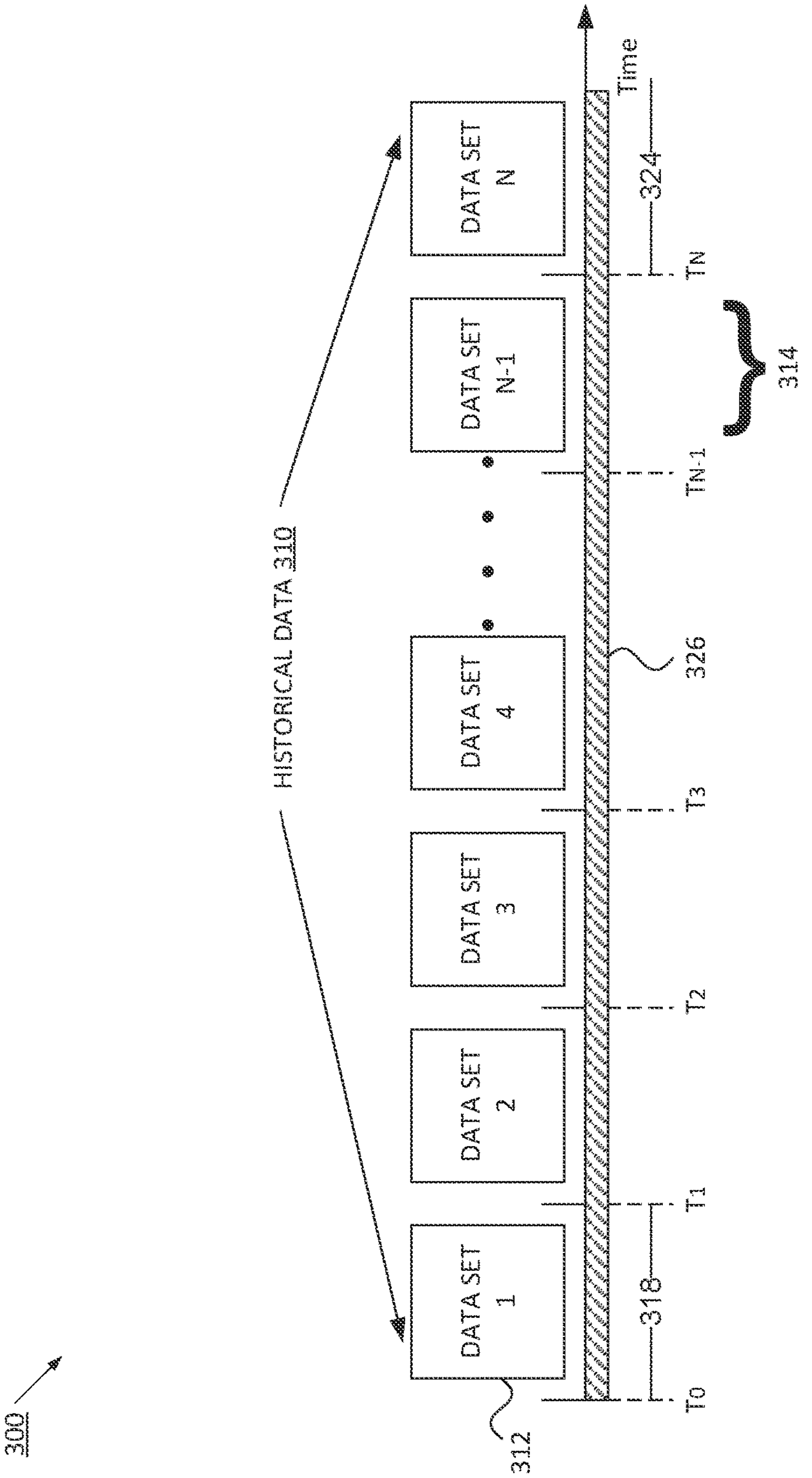
FIG. 3 illustrates a timeline depicting collected historical data pertaining to content items of a group of content items associated with a common topic, in accordance with implementations of the present disclosure.

FIG. 3 depicts a timeline 300 depicting collected historical data 310 pertaining to content items of a group of content items associated with a common topic, in accordance with implications of the present disclosure. Historical data 310 may include one or more data sets 312 each associated with a point in time 314 of timeline 300. In some embodiments, a point in time 314 may correspond with a period of time at which a content item of the group of content items was presented to a user of a content sharing platform (e.g., an hour, a day, a week, etc.). Each data set may include data corresponding to a content item presented to a user of the content sharing platform during the point in time 314. For example, each data set 312 may include one or more attributes associated with the content item, one or more attributes associated with a user that was presented with the content item, and contextual information associated with a user device of the user. Each data set may further include data corresponding to user engagement of the content item. For example, each data set 312 may include an indication as to whether the user consumed the content item, interacted with the content item, and/or performed an activity prompted by the content item Training set generator 251 of FIG. 2 may determine, from historical data 310, an initial point in time 318 at which the content items associated with the common topic were first presented to users. In some implementations, the content items may have been presented to users based on a random selection of the content items. In other or similar implementations, the content items may have been recommended to be presented to users based on an output of a trained ML model.

In some implementations, the initial point in time 318 may be determined based on an initial instance that any content item from the group of content items was presented to a user. In response to determining the initial point in time 318, training set generator 251 may extract, from historical data 310, data sets 312 pertaining to the content items presented to users between the initial point in time 318 and a final point in time 324 of a period of time 326. In accordance with the previous example, if the period of time 326 is 14 days, training set generator 251 may extract data sets 312 pertaining to the content items that were presented to users between the initial point in time 318 (e.g., day 0) and the final point in time 324 (e.g., day 14).

The extracted historical data may be used by training set generator 251 to generate training data 242 for use in simulation tests run by simulation module 222. Training set generator 251 may parse the extracted historical data to generate one or more training data sets each including a subset of training inputs and target outputs. Training inputs for each training data set may include attributes associated with the content item of the group of content items, attributes associated with a user that was presented with the content item, and/or contextual information associated with a user device of the user. Training outputs for each training data set may include an identifier associated with the content item, a confidence level that the user consumed the content item, the user interacted with the content item, and/or the user performed an activity prompted by the content item.

Figure 4A:
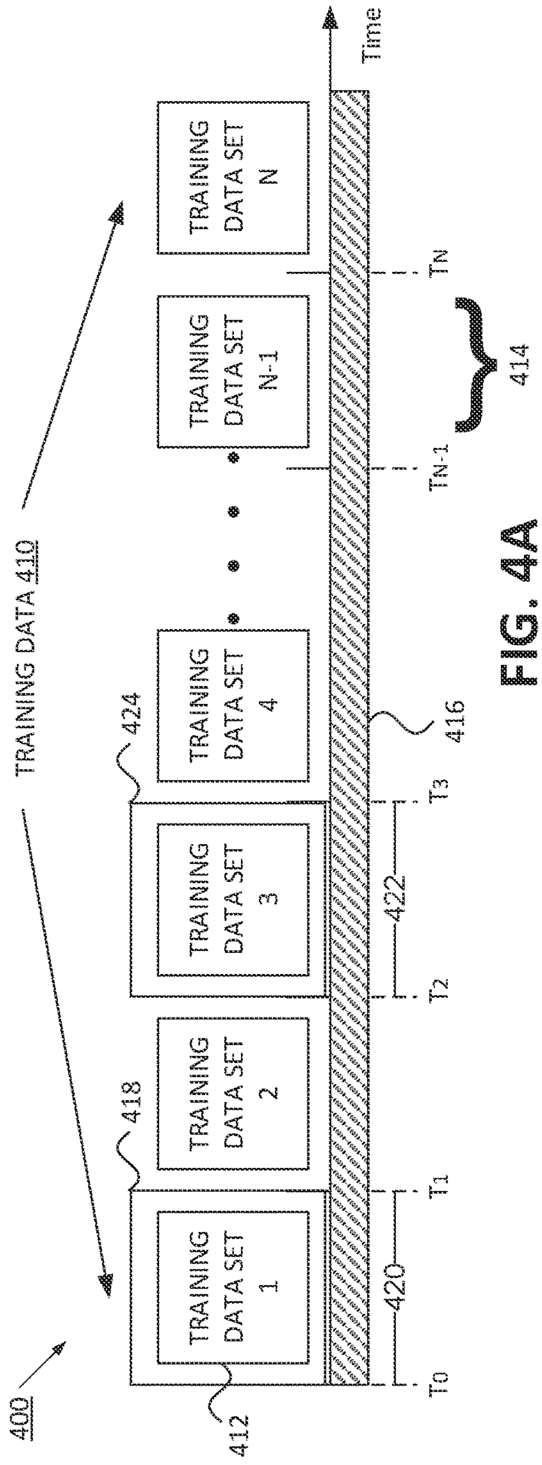
FIGS. 4A and 4B illustrate a timeline depicting selecting training data collected at a first point in time to train a first machine learning model for a simulation test performed for a second point in time, in accordance with implementations of the present disclosure.
Figure 4B:
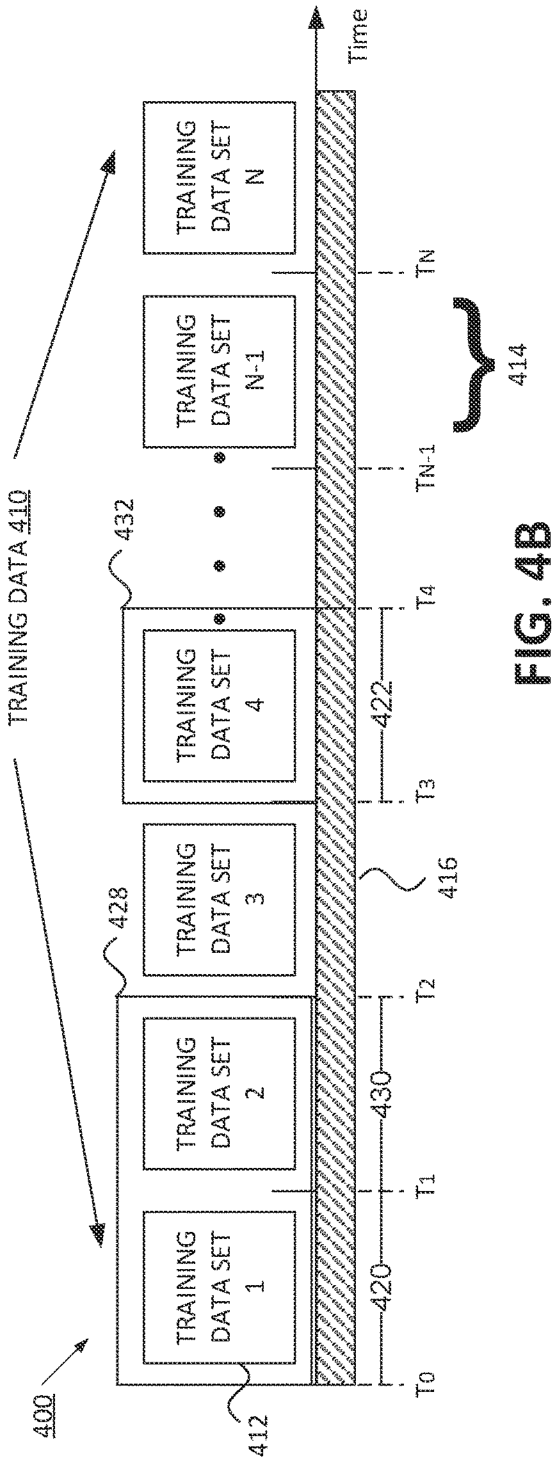

In some implementations, ML training module 230 of processing device 210 may gradually train the ML model using the training data. FIGS. 4A and 4B illustrate a timeline 400 depicting selecting training data collected over a first point in time 420 to train a ML model for a simulation test performed for a second point in time 422, in accordance with implementations of the present disclosure. In some implementations, each training data set 412 may correspond with a training data set generated by training set generator 251. Each training data set 412 may be associated with a point in time 414 of a period of time 416. In some implementations, period of time 416 may correspond with period of time 326 described with respect to FIG. 3.

ML training module 230 may train the ML model using a first initial training data set 418. The first initial training data set 418 may include one or more training data sets 412 each training data set 412 is associated with a point in time 414 of the period of time 416. For example, ML training module 230 may train the ML model using first initial training data set 418 where first initial training data set 418 is associated with a first point in time 420.

In response the ML model being trained using first initial training data set 418, simulation module 222 may run a first simulation test on the trained ML model. Simulation module 222 may identify simulation data to be used to run the simulation test. In some implementations, simulation data may be identified from training data 410. Simulation data may include one or more training inputs generated for training data set 412 associated with a point in time subsequent to the first point(s) in time 420 associated with the first initial training data set 418. For example, training data set 1 may be selected as the first initial training data set 418, where training data set 1 is associated with first point in time 420. Simulation module 222 may identify training inputs from training data set 3 to be used as simulation data for the first simulation test run on the trained ML model. As illustrated in FIG. 4A, training data set 3 is associated with a subsequent point in time 422 from first point in time 420.

Simulation module 222 may run a first simulation test on the trained ML model by providing the simulation data (e.g., training inputs of training data set 3) as an input to the trained ML model. The trained ML model may generate one or more outputs based on the provided simulation data. In some implementations, for each training input of the simulation data provided to the trained ML model, an output indicating an identifier of a content item, a confidence level that a user will consume the content item, and/or a confidence level that a user will interact with the content item may be generated.

Simulation module 222 may determine an accuracy of the outputs produced by the trained ML model. In some embodiments, for each output produced by the trained ML model, simulation module 222 may determine whether an identified content item provided as an output to the ML model would have been recommended for presentation to a user based on one or more confidence levels included in the output of the trained ML model (referred to as simulated result). Simulation module 222 may determine how a user presented with the content item reacted to the content item based on the subset of target outputs associated with the target inputs of the simulation data (referred to as actual result). In an illustrative example, a first training input of training data set 3 may be provided as input to the ML model trained using data set 1. The trained ML model may generate an output including an identification of a content item for presentation to a user, a first confidence level that user will consume the content item, and a second confidence level the user will interact with the content item. Simulation module 222 may determine, based on the first confidence level and the second confidence level, whether the content item would have been recommended for presentation the user (i.e., the simulated result). Simulation module 222 may identify a first target output of training set data 3 corresponding with the first training input of training data set 3. The first target output may indicate whether the user, when actually presented with the content item, actually consumed the content item and whether the user actually interacted with the content item (i.e., the actual result). Simulation module 222 may compare the simulated result with the actual result to determine whether the user would have acted in accordance with the simulated result. Simulation module 222 may determine that the simulated result was an accurate result in response to determining that the user would have acted in accordance with the output provided by the trained ML model.

Simulation module 222 may determine an accuracy of simulated results for each training input of the simulation data (e.g., the subset of training inputs of training data set 3). Simulation module 222 may also determine an overall accuracy of all simulated results and an overall accuracy of actual results. For example, training data set 3 may have been generated based on historical data collected from a random recommendation of a content item to a user. The overall accuracy of actual results may include the accuracy of all random recommendations made during the point in time 414 associated with training data set 3 (e.g., did a user presented with a randomly recommended content item interact with the content item?). The overall accuracy of all simulated results may include the accuracy of the recommendations provided by the ML model trained using first initial training data set 418 and tested using the subset of training inputs of training data set 3 (i.e., did the ML model recommend the content item that the user did interact with?). In some embodiments, a result of the first simulation test may be a difference between the overall accuracy of the simulated results and the overall accuracy of the actual results. The result of the first simulation test may be stored in memory 240 as a first simulation test result 260.

ML training module 230 may re-train the ML model using a second initial training data set 428. Referring now to FIG. 4B, a second initial training data set 428 may be identified. Second initial training data set 428 may include two or more training data sets 412 of training data 410. Second initial training data set 428 may include the one or more training data sets 412 included in first initial training data set 418. Second initial training data set 428 may also include one or more data training sets 412 associated with points in time that are subsequent to the points in time associated with the first initial training data set 418. For example, second initial training data set 428 may include training data set 1 and training data set 2, where training data set 1 is associated with a first point in time 420 and training data set 2 is associated with a second point in time 430, wherein second point in time 420 is subsequent to first point in time 420.

In response to the ML model being re-trained using second initial training data set 428, simulation module 222 may run a second simulation test on the re-trained ML model. Simulation module 222 may identify simulation data to be used to run the second simulation test in accordance with previously described embodiments. For example, first training data set 1 and first training data set 2 may be included in second initial training data set 428. Simulation module 222 may identify a subset of training inputs from training data set 4 to be used as simulation data for the second simulation test.

The second simulation test may be run on the re-trained ML model, in accordance with previously described embodiments. The re-trained ML model may generate one or more outputs based on the provided simulation data (e.g., the subset of training inputs from training data set 4). Simulation module 222 may generate a simulated result based on the outputs of the ML model and an actual result based on target outputs associated with the simulation data for the second simulation test (e.g., the target outputs of training set 4). Simulation module 212 may generate a result of the second simulation test and store the result in memory 240 as a second simulation test result 260, in accordance with previously described implementations.

ML training module 230 may gradually re-train the ML model using multiple initial training data sets, in accordance with previously described implementations. Similarly, simulation module 222 may continuously run simulation tests using the re-trained ML model and simulation data identified from training data 410. The ML model may be re-trained and simulation tests may be run until a simulation test result 244 has been generated for each point in time 414 during the period of time 416. As discussed previously, each simulation test result 244 may be stored in memory 240.

Simulation test determination module 224 may determine a simulation test at which corresponding results of the ML model satisfy a threshold condition. In some implementations, the threshold condition may be based on whether, for a given simulation test, a simulated result exceeds the actual result. In some implementations, simulation test determination module 224 may identify a first simulation test at which corresponding results of the ML model satisfy the threshold condition, where the first simulation test was run using simulation data that was identified from training data 410 associated with an earliest point in time 414 of the period of time 416. In an illustrative example, simulation test destination module 224 may determine identify a first simulation test and a second simulation test at which corresponding results of the ML model satisfy the threshold condition. The first simulation test may have been run using simulation data that was identified from training data associated with an earlier point in time than the point in time associated with the simulation data used for the second simulation test (e.g., training data set 3 was used for the first simulation test and training data set 4 was used for the second simulation test). As such, simulation test determination module 224 may identify the first simulation test as the simulation test at which corresponding results of the ML model satisfy the threshold condition.

In response to simulation test determination module 224 determining the simulation test at which corresponding results of the ML model satisfy the threshold condition, training set data identification module 226 may identify a training data set of the training data on which the ML model used during the determined simulation test was trained. For example, training data set identification module 226 may identify second initial training data set 428 as the training data on which the ML model used during the determined simulation test was trained. As discussed previously second initial training data set 428 may include training data set 1 and training data set 2. As such, the training data set identified by training set identification module 226 may include a subset of training inputs and target outputs that include training inputs and target outputs from training data set 1 and training data set 2. In response to training set identification module 226 identifying the training data set, target output determination module 228 may identify a subset of target outputs included in the identified training data set. The subset of target outputs may define the threshold number of target outputs sufficient to train another ML model.

Figure 5:
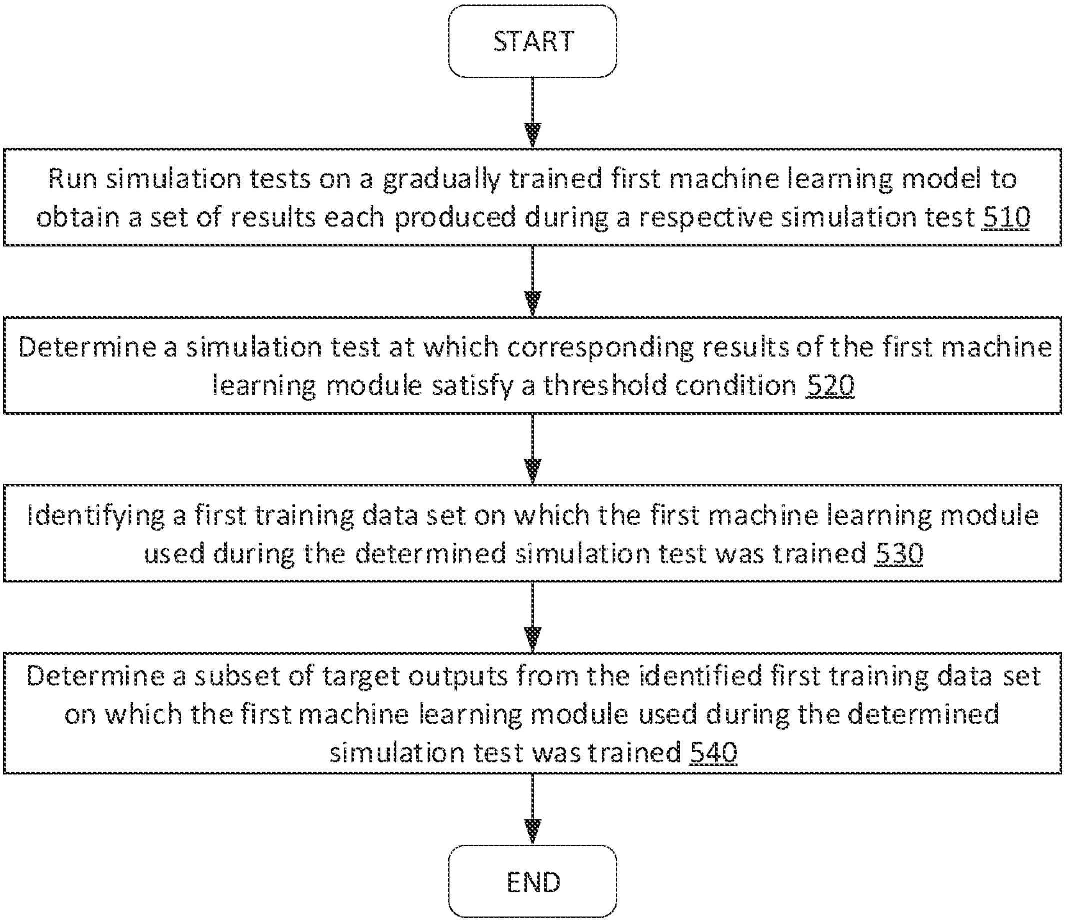
FIG. 5 depicts a flow diagram of a method for determining target outputs to define a threshold amount of training data to be sufficient to train a machine learning model, in accordance with implementations of the disclosure.
Figure 6:
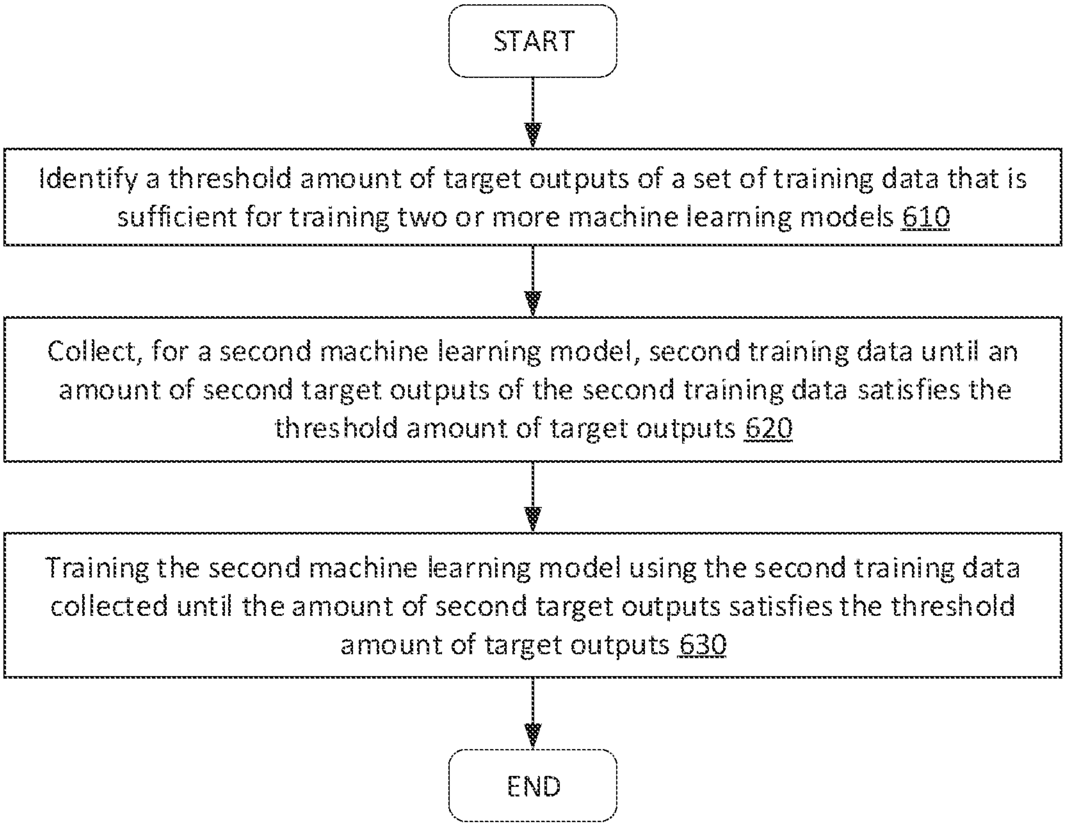
FIG. 6 depicts a flow diagram of a method for training a machine learning model using training data collected until a threshold amount of target outputs are satisfied, in accordance with implementations of the disclosure.

FIG. 5 depicts a flow diagram of a method 500 for determining threshold outputs to define a threshold amount of training data to be sufficient to train a ML model, in accordance with implementations of the disclosure. FIG. 6 depicts a flow diagram of a method 600 for training a ML model using training data collected until a threshold amount of target outputs are satisfied, in accordance with implementations of the disclosure. Methods 500 and 600 may be performed by processing logic that may include hardware (circuitry, dedicated logic, etc.), software (e.g., instructions run on a processing device), or a combination thereof. In one implementation, some or all the operations of methods 500 and 600 may be performed by one or more components of system 100 of FIG. 1.

Referring now to FIG. 5, at block 510, processing logic runs simulation tests on a first ML model to obtain a set of results each produced during a respective simulation test. The first ML model may be gradually trained using first training data historically collected over a period of time. The first training data may include one or more first data sets each including a subset of first training inputs and first target outputs associated with a point of time of a set of points in time during the period of time.

In some embodiments, processing logic may train the first ML model using an initial training data set including a first subset of training inputs and first target outputs associated with one or more initial points in time of the set of points in time during the period of time. The initial training data set is included in the first training data historically collected over a period of time. Processing logic may identify a subsequent training data set including a second subset of first training inputs and first target outputs associated with a subsequent point in time to the one or more initial points in time. The subsequent training data set may be included in the first training data historically collected over a period of time.

Processing logic may re-train the first ML model on the initial training data set and the subsequent training data set.

Processing logic may collect the first training data used to train the first ML model by identifying, from historical data pertaining to one or more content items of a particular type, a set of historical data pertaining to a set of content items from the set of content items that is associated with one or more common topics. An initial point in time at which one or more of the set of content items were presented to users of a content sharing platform is determined. Processing logic may extract a subset of historical data pertaining to a subset of content items that were presented to users of a content sharing platform between the initial point in time and a final point in time of the period of time from the set of historical data pertaining to the set of content items associated with one or more common topics. The subset of historical data may correspond with data collected in response to a user interaction with a content item of the subset of content items that were presented to users of the content sharing platform between the initial point in time and a final point in time. The content item of the subset of content items may have been randomly selected to be presented to the user.

At block 520, processing logic may determine a simulation test run on the gradually trained first ML model at which corresponding results of the first ML model satisfy a threshold condition. The threshold condition may be based on historical data at a first point in time of the set of points in time. In some implementations, the threshold condition may be based on a second accuracy of one or more recommendations of one or more content items randomly selected from the one or more content items. In further implementations, the determined simulation test may satisfy the threshold condition in response a first accuracy of the first ML model exceeding the second accuracy.

At block 530, processing logic may identify a first training data set of the first training data sets on which the first ML model used during the determined simulation test was trained. The first training data set on which the first ML model used during the determined simulation test was trained may be associated with one or more second points in time that precede the first point in time.

At block 540, processing logic determine a subset of target outputs from the identified first training data set on which the first ML model used during the determined simulation test was trained. The determined set of first target outputs may define a threshold amount of second training data to be sufficient to train a second ML model. The second training data to train the second ML model may pertain to a second set of content items from one or more content items that are associated with one or more second common topics, where at least one first common topic is different from at least one second common topic.

As discussed above, FIG. 6 depicts a flow diagram of a method 600 for training a ML model using training data collected until a threshold amount of target outputs are satisfied, in accordance with implementations of the disclosure. At block 610, processing logic may identify a threshold amount of target outputs of a set of training data that is sufficient for training two or more ML models. The threshold amount of target outputs may be determined based on results of a simulation test run on a first ML model trained using first training data, in accordance with method 500 of FIG. 5. The results of the simulation test run on the first ML model may be associated with an accuracy of one or more outputs of the first ML model identifying one or more content items from content items to be recommended to a user of a content sharing platform. The first training data may include two or more first training data sets each including a subset of first training inputs and first target outputs. In some implementations, the first training data pertains to a first set of content items from content items that is associated with one or more first common topics.

At block 620, processing logic may collect second training data for a second ML model. The second training data may include two or more second training data sets each including a subset of second training inputs and second target outputs. Processing logic may collect the second training data until an amount of second target outputs satisfies the threshold amount of target outputs. In some implementations, the second training data pertains to a second set of content items from the content items that is associated with one or more second common topics. At least one first common topic may be different from at least one second common topic.

In some implementations, the subset of second training inputs and second target outputs may include at least one of: one or more attributes associated with a previously presented content item that was consumed by each of a first set of users of a content sharing platform, one or more attributes associated with each of the first set of users of the content sharing platform, or contextual information associated with a user device of each of the first set of users of the content sharing platform. In other or similar implementations, the subset of second target outputs may indicate a content item identifier and at least one of: a first level of confidence that a user of a content sharing platform is to consume the content item, a second level of confidence that the user is to interact with the content item, or a third level of confidence that a user is to perform an activity prompted by the content item. At block 630, processing logic may train the second ML model using the second training data collected until the amount of second target outputs collected satisfies the threshold amount of target outputs.

Figure 7:
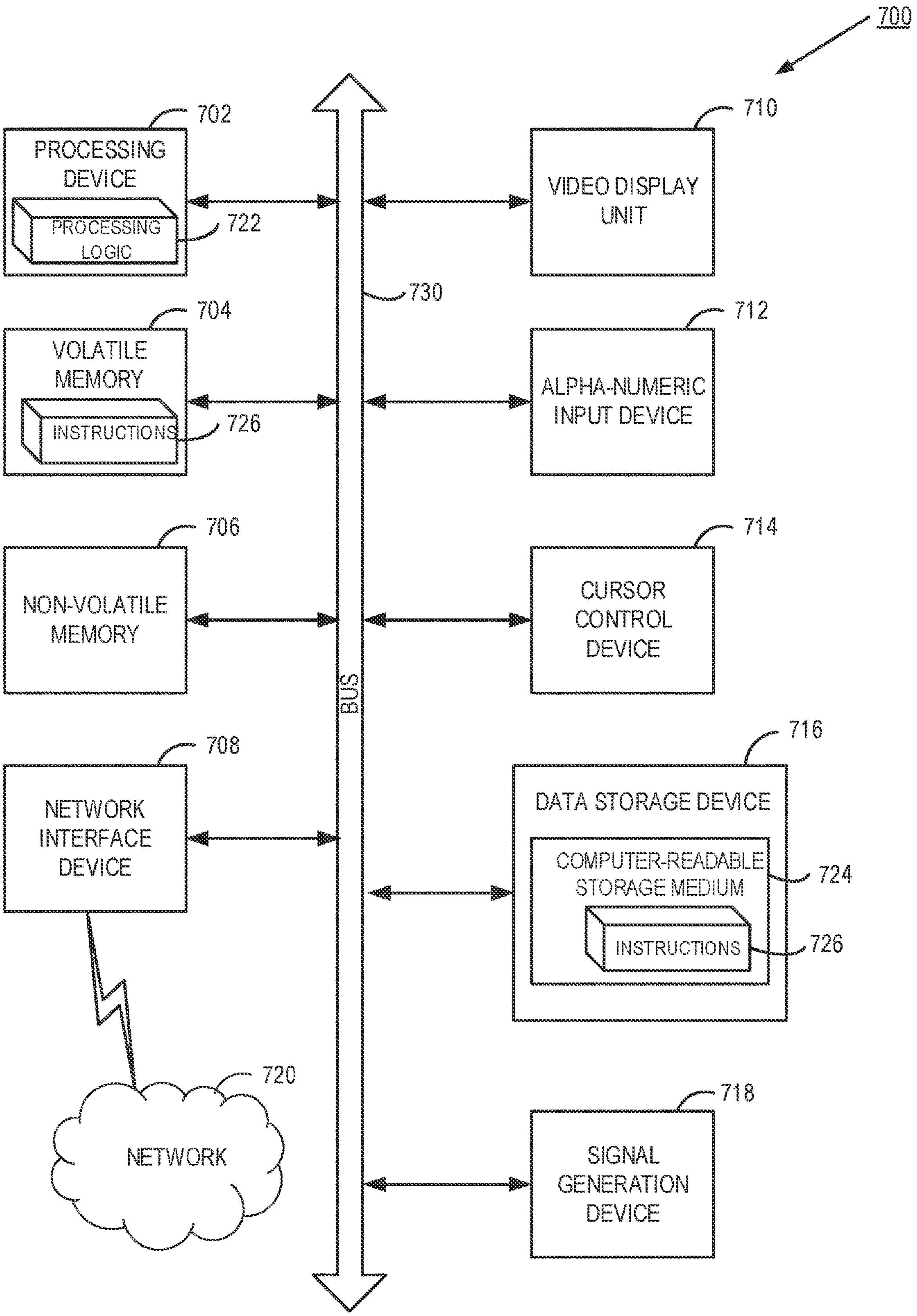
FIG. 7 is a block diagram illustrating an exemplary computer system, in accordance with implementations of the present disclosure.

FIG. 7 is a block diagram illustrating an exemplary computer system, in accordance with implementations of the present disclosure. The computer system 700 can be the server machine 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for predicting channel lineup viewership) for performing the operations discussed herein.

The computer system 700 can further include a network interface device 708. The computer system 800 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for predicting channel lineup viewership) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for predicting channel lineup viewership. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

obtaining a first machine learning model trained using a first set of training data, wherein one or more training data items of the first set of training data reflect at least a first attribute of a respective media content item;

executing one or more simulation tests using the first machine learning model to generate one or more simulation outputs comprising a performance of the first machine learning model trained using the first set of training data;

obtaining a second set of training data to train a second machine learning model, wherein: (i) the second set of training data includes a number of training data items corresponding to a minimum training data set size based on the one or more simulation outputs and a size of the first set of training data, and (ii) the second set of training data comprises the one or more training data items of the first set of training data and one or more additional training data items reflecting one or more second attributes of the respective media content item, the one or more second attributes providing an increased level of granularity with respect to the respective media content item; and causing the second machine learning model to be trained using the second set of training data.

2. The method of claim 1, wherein the one or more simulation outputs indicate at least one of an accuracy or a quality of one or more outputs of the first machine learning model based on the one or more simulation tests.

3. The method of claim 2, further comprising:

prior to obtaining the second set of training data, determining that at least one of the accuracy of the one or more outputs-exceeds an accuracy threshold or the quality of the one or more outputs exceeds a quality threshold.

4. The method of claim 1, wherein the first set of training data comprises a plurality of training data items each associated with one of a plurality of points in time during a time period, and wherein the minimum training data set size is based on a threshold condition based on historical data at a first point in time of the plurality of points in time.

5. The method of claim 4, further comprising:

identifying one or more training data items of the plurality of training data items associated with one or more second points in time that precede the first point in time; and determining a size of the identified one or more training data items, wherein the size of the second set of training data corresponds to the determined size of the identified one or more training data items.

6. The method of claim 1, wherein the first attribute comprises at least one of: an attribute associated with a content item accessed by a user of a content sharing platform, an attribute associated with the user of the content sharing platform, contextual information associated with a user device of the user of the content sharing platform, an indication of whether the user consumed the content item, an indication of whether the user interacted with the content item, or an indication of whether the user performed an activity prompted by the content item.

7. The method of claim 1, wherein one or more additional training data items of the first set of training data pertain to a first set of content items associated with one or more first common topics and one or more additional training data items of the second set of training data pertain to a second set of content items associated with one or more second common topics, and wherein at least one of the one or more first common topics is different from at least one of the one or more second common topics.

8. The method of claim 1, wherein the first set of training data comprises a first subset of training inputs and a first subset of target outputs and the second set of training data comprises a second subset of training inputs and a second subset of target outputs, and wherein a size of the second subset of target outputs corresponds to a size of the first subset of target outputs.

9. A system comprising:

a memory; and a processing device coupled to the memory, the processing device configured to perform operations comprising:

obtaining a first machine learning model trained using a first set of training data, wherein one or more training data items of the first set of training data reflect at least a first attribute of a respective media content;

executing one or more simulation tests using the first machine learning model to generate one or more simulation outputs comprising a performance of the first machine learning model trained using the first set of training data;

obtaining a second set of training data to train a second machine learning model, wherein: (i) the second set of training data includes a number of training data items corresponding to a minimum training data set size based on the one or more simulation outputs and a size of the first set of training data, and (ii) the second set of training data comprises the one or more training data items of the first set of training data and one or more additional training data items reflecting one or more second attributes of the respective media content item, the one or more second attributes providing an increased level of granularity with respect to the respective media content item; and causing the second machine learning model to be trained using the second set of training data.

10. The system of claim 9, wherein the one or more simulation outputs indicate at least one of an accuracy or a quality of one or more outputs of the first machine learning model based on the one or more simulation tests.

11. The system of claim 10, wherein the operations further comprise:

prior to obtaining the second set of training data, determining that at least one of the accuracy of the one or more outputs exceeds an accuracy threshold or the quality of the one or more outputs exceeds a quality threshold.

12. The system of claim 9, wherein the first set of training data comprises a plurality of training data items each associated with one of a plurality of points in time during a time period, and wherein the minimum training data set size is based on a threshold condition based on historical data at a first point in time of the plurality of points in time.

13. The system of claim 12, wherein the operations further comprise:

identifying one or more training data items of the plurality of training data items associated with one or more second points in time that precede the first point in time; and determining a size of the identified one or more training data items, wherein the size of the second set of training data corresponds to the determined size of the identified one or more training data items.

14. The system of claim 9, wherein the first attribute comprises at least one of: an attribute associated with a content item accessed by a user of a content sharing platform, an attribute associated with the user of the content sharing platform, contextual information associated with a user device of the user of the content sharing platform, an indication of whether the user consumed the content item, an indication of whether the user interacted with the content item, or an indication of whether the user performed an activity prompted by the content item.

15. A non-transitory computer readable storage medium comprising instructions that, when executed by a processing device, cause the processing device to perform operations comprising:

obtaining a first machine learning model trained using a first set of training data, wherein one or more training data items of the first set of training data reflect at least a first attribute of a respective media content item;

executing one or more simulation tests using the first machine learning model to generate one or more simulation outputs comprising a performance of the first machine learning model trained using the first set of training data;

obtaining a second set of training data to train a second machine learning model, wherein: wherein: (i) the second set of training data includes a number of training data items corresponding to a minimum training data set size based on the one or more simulation outputs and a size of the first set of training data, and (ii) the second set of training data comprises the one or more training data items of the first set of training data and one or more additional training data items reflecting one or more second attributes of the respective media content item, the one or more second attributes providing an increased level of granularity with respect to the respective media content item; and causing the second machine learning model to be trained using the second set of training data.

16. The non-transitory computer readable storage medium of claim 15, wherein the one or more simulation outputs indicate at least one of an accuracy or a quality of one or more outputs of the first machine learning model based on the one or more simulation tests.

17. The non-transitory computer readable storage medium of claim 16, wherein the operations further comprise:

prior to obtaining the second set of training data, determining that at least one of the accuracy of the one or more outputs exceeds an accuracy threshold or the quality of the one or more outputs exceeds a quality threshold.

18. The non-transitory computer readable storage medium of claim 15, wherein the first set of training data comprises a plurality of training data items each associated with one of a plurality of points in time during a time period, and wherein the minimum training data set size is based on a threshold condition based on historical data at a first point in time of the plurality of points in time.

19. The non-transitory computer readable storage medium of claim 18, wherein the operations further comprise:

identifying one or more training data items of the plurality of training data items associated with one or more second points in time that precede the first point in time; and determining a size of the identified one or more training data items, wherein the size of the second set of training data corresponds to the determined size of the identified one or more training data items.

20. The non-transitory computer readable storage medium of claim 15, wherein the first attribute comprises at least one of: an attribute associated with a content item accessed by a user of a content sharing platform, an attribute associated with the user of the content sharing platform, contextual information associated with a user device of the user of the content sharing platform, an indication of whether the user consumed the content item, an indication of whether the user interacted with the content item, or an indication of whether the user performed an activity prompted by the content item.

* * * * *